United States Patent [19]

Doane

[11] Patent Number: 5,104,061
[45] Date of Patent: Apr. 14, 1992

[54] DUAL ECCENTRIC BEARING FOR ADJUSTMENT OF PIVOTING AIRCRAFT WINGS

[75] Inventor: William J. Doane, San Diego, Calif.

[73] Assignee: General Dynamics Corporation, Convair Division, San Diego, Calif.

[21] Appl. No.: 528,515

[22] Filed: May 25, 1990

[51] Int. Cl.⁵ .............................................. B64C 3/38
[52] U.S. Cl. .................................. 244/46; 74/571 M; 244/131; 244/47; 244/48
[58] Field of Search ...................... 244/39, 131, 46, 47, 244/48, 49; 74/571 M; 403/131, 143, 157, 158

[56] References Cited

U.S. PATENT DOCUMENTS

| | | | |
|---|---|---|---|
| 3,451,646 | 6/1969 | Aarnaes | 244/46 |
| 3,525,448 | 8/1970 | Bauer | 403/157 |
| 3,529,790 | 9/1970 | Buch | 244/48 |
| 3,795,374 | 3/1974 | Zech et al. | 244/46 |
| 4,212,441 | 7/1980 | Ascani, Jr. et al. | 244/46 |

Primary Examiner—Galen Barefoot
Assistant Examiner—Linda L. Palomar
Attorney, Agent, or Firm—John R. Duncan; Frank D. Gilliam

[57] ABSTRACT

A dual eccentric bearing system for precise adjustment of wing incidence and dihedral. The bearing system is utilized in the attachment of wings that vary the sweep by rotation about a pivot fixedly located on an aircraft fuselage through an interconnecting wing pivot pin. The top portion of the pivot pin is supported by the dual eccentric bearing system and the bottom by a non-eccentric bearing system. The eccentric bearing system has both an eccentric ball retaining ring free to rotate relative to its fuselage attachment and a ball contained within the ring which includes an eccentric pivot pin receiving aperture free to rotate within the ring containment. The bottom end of the pin is supported by a conventional non-eccentric bearing system with the ring fixedly held in position by its fuselage connection. The ball of the non-eccentric bearing has a similar pin receiving aperture with the ball free to rotate angularly relative to the ring. Locking members are provided to lock selected relative rotational positions of the ring and ball of the eccentric bearing system so as to tilt the pin relative to the centerline through the races to provide a selected incidence and dihedral to the wing attached thereto when the wing is rotated about the pin to a deployed position from a stowed position.

12 Claims, 4 Drawing Sheets

DUAL ECCENTRIC BEARING FOR ADJUSTMENT OF PIVOTING AIRCRAFT WINGS

BACKGROUND OF THE INVENTION

The invention is directed to bearings for supporting aircraft wings which rotate and more particulary to bearings that can be adjusted while installed to vary the incidence and dihedral of a wing when swept to a deployed position from a stowed position.

The current and most popular method of establishing correct wing incidence and dihedral in a deployed or sweep position is to hand select bushings with differently angled apertures therethrough until the selected angle through the aperture provides the selected pin centerline angle for the proper incidence and dihedral to be established. This necessitates the removal of the wing as many times as it takes to select the proper angled bushing. This is time consuming and can create wing damage problems which are costly.

The following U.S. Pat. Nos. teach sweep wing aircraft: 3,206,146; 3,279,721; 3,451,646; 3,606,978; 3,680,816; 3,645,477; 3,776,490; 3,795,374; 4,212,441; 4,336,914; and 4,667,898.

The following U.S. Pat. Nos. teach means for changing the wing incidence for varying angles of attach: U.S. Pat. No. 3,292,881 and 3,529,790.

The following U.S. Pat. Nos. teach concentric bushings: 1,144,627; 1,571,557; 1,443,685; and 2,711,935.

None of the above cited reference teach a two bearing rotatable pin support system wherein the pin centerline is selectively angularly tiltable relative to one pin end which can be accomplished while the wing is installed.

The present invention will find wide acceptance in this art.

SUMMARY OF THE INVENTION

The invention comprises a pair of vertically spaced apart bearings fixed in place on the fuselage of an aircraft. The center of the balls of the bearings have an aperture for accepting a pivot pin for pivotally connecting a rotatable or sweep wing to the fuselage. One of the bearings, shown in the various Figures as the uppermost bearing, has an eccentric ball bearing confining ring. The ring is free to turn or rotate relative to its fuselage connection so that the ring can be rotationally positioned to vary the center line through the ball bearing confining aperture. Likewise the pin receiving aperture of the ball has its center line off of the true centerline through the ball. The ball is free to rotate relative to the ring. The relative rotational positions of the ring relative to the fuselage and the ball relative to the ring determines the pin centerline through the bearing. The other pin support bearing, shown in the drawing Figures as the lower bearing, has its ring fixed in position relative to its fuselage connection and the ball bearing receiving aperture through the ring is centered thereon and the pin receiving aperture of this bearing is likewise centered thereon. It should now be understood that the angle of the pin relative to a true centerline between the bearings can be angled relative to the fixed in place or non-eccentric bearing by rotating the ring relative to its fuselage connection and/or rotating the ball relative to the ring. When the ring and/or ball are properly positioned they are locked in that position by a lock member which comprises a pair of disks and a retainer.

Each disk has a plurality of downward extending protrusions which mesh with circumferential teeth on the ring and upward extending protrusions on the ball. The disks are held in position by a locking element connected to the fuselage by mechanical means.

An object of this invention is to provide an attachment means for attaching sweep wings to an aircraft so that the wing incidence and dihedral can be adjusted after wing installation without removal of the wing from the aircraft.

Another object of this invention is to provide an eccentric bearing system for adjusting the incidence and dihedral of a rotatable wing attached to an aircraft.

These and other objects and advantages of the present invention will become apparent to those skilled in the art after considering the following detailed specification in which the preferred embodiment are described in conjunction with the accompanying drawing Figures.

BRIEF DESCRIPTION OF THE DRAWING FIGURES

DETAILED DESCRIPTION OF THE PREFERRED EMBODIMENT OF THE INVENTION

Figure 1:
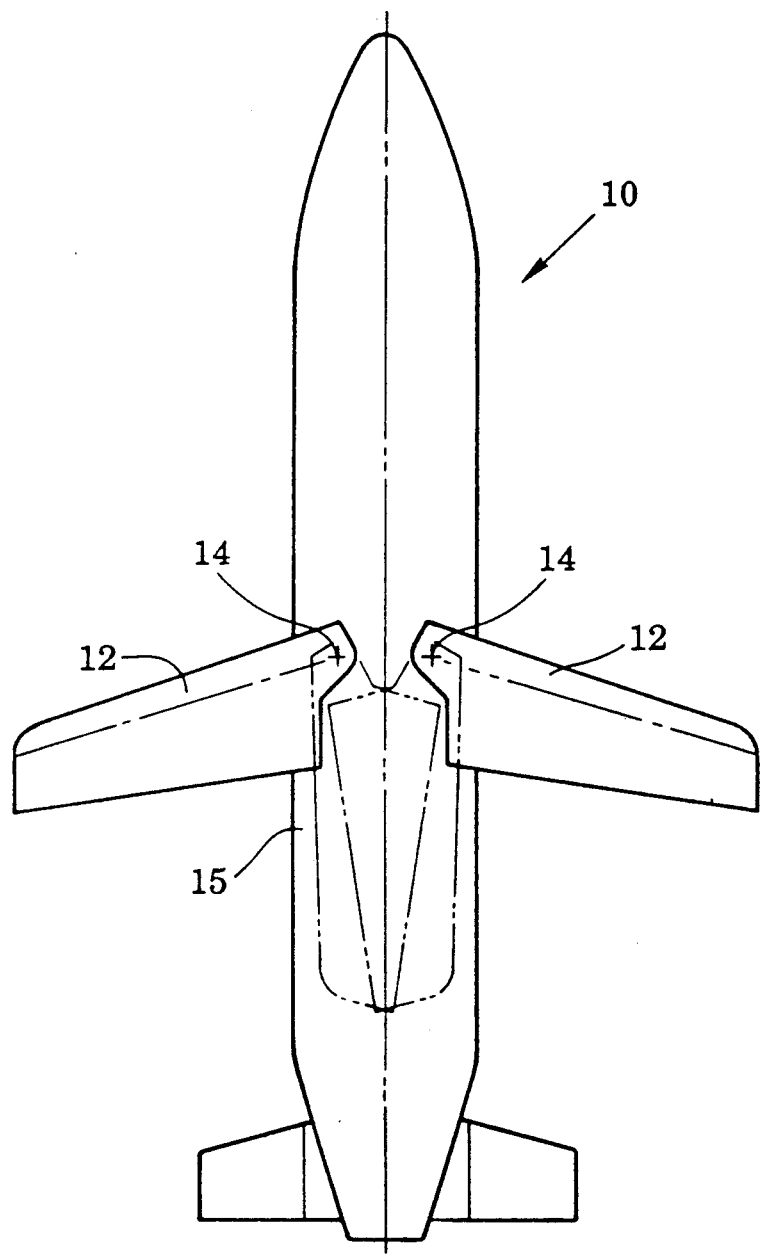
FIG. 1 is a plan showing of a typical aircraft employing the instant invention.

Referring now to the various drawing Figures, FIG. 1 shows a typical aircraft 10 with wings 12 rotatable about pivot points 14 between deployed and stowed positions relative to the fuselage 15. The stowed position of the wings are shown in phantom in FIG. 1. Aircraft of this type are well known in the art.

Figure 2:
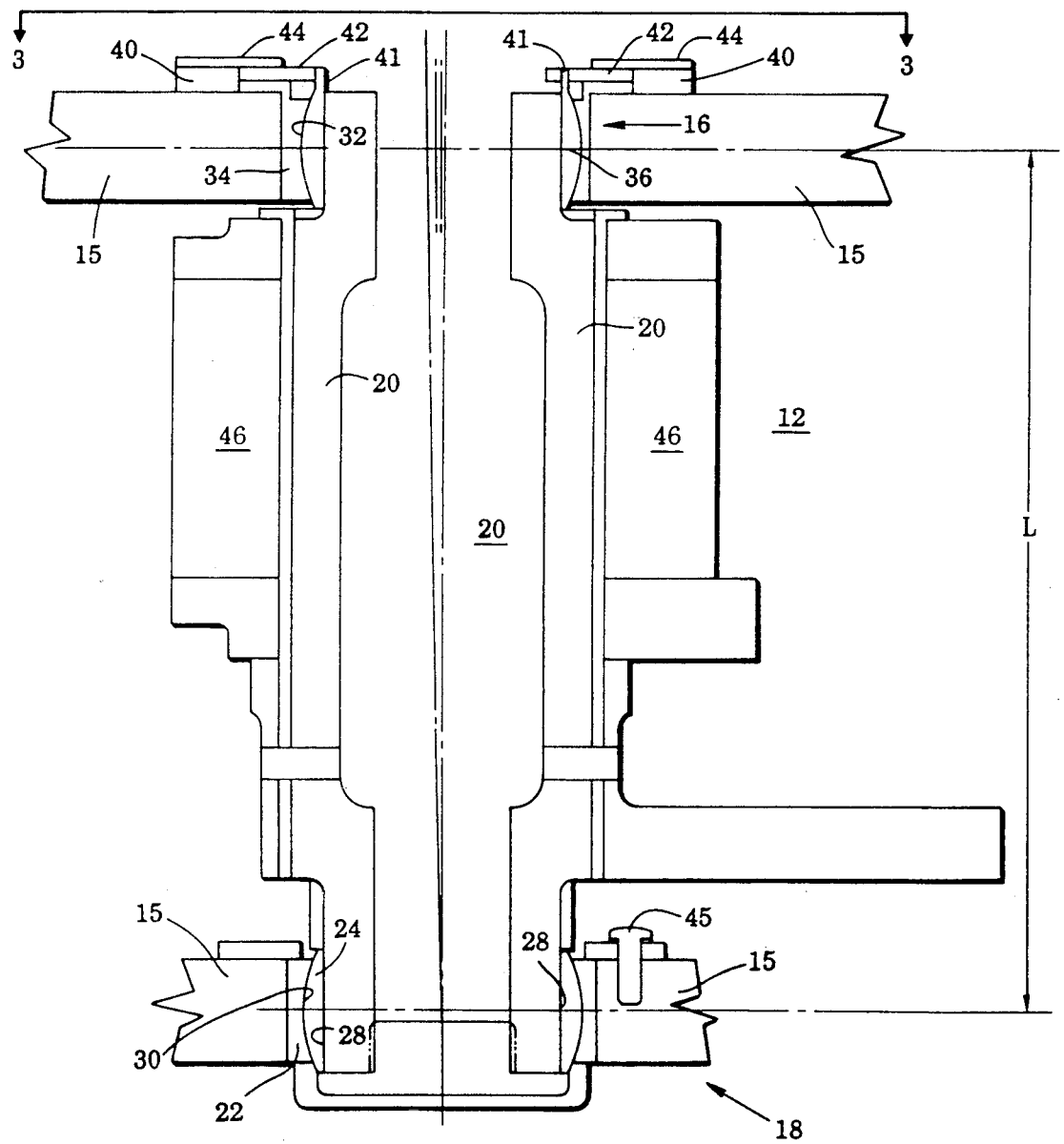
FIG. 2 is a cutaway showing of the pivot pin support system including the double eccentric bearing of the present invention and a typical non-eccentric bearing.

The pivot points 14 comprise a pair of support ball bearings 16 and 18 and a pivot pin 20, as shown in drawing FIG. 2. One of the support bearings identified as 18 is a conventional ball bearing having a ball retaining ring 22 fixedly attached to the fuselage 15 of the aircraft 10 and a rotatable ball 24 captured and rotatable relative to the ring 22. An aperture 28 passes through the ball and is sized to receive one end of the pivot pin 20. The aperture 28 is centered relative to the ball's ring engaging surface 30.

Figure 3:
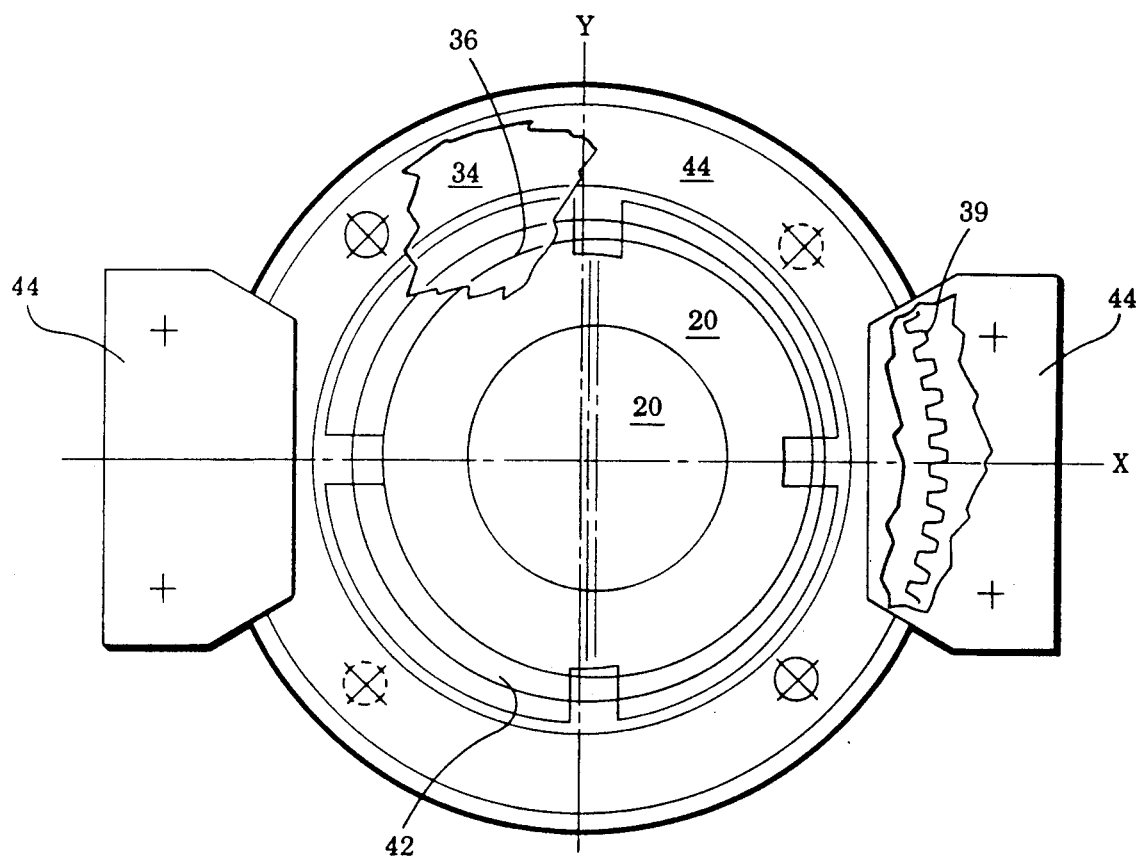
FIG. 3 is a showing taken along line 3—3 of FIG. 2.

Located at the opposite end of the pivot pin is an eccentric support ball bearing 16 of the invention. The ball bearing 16 resembles the bearing 18 except that the center of the ball receiving opening 32 of the ring 34 is positioned off of the true center and the pivot pin receiving opening through the ball 36 is likewise located off of the true center of the ball 36. The off center distance of both the pin receiving openings of the ball and ring can be equal or unequal. The ball pin opening and ring ball retaining opening can be off center a distance in a range of from 15 to 50 thousands of an inch. A ball and ring aperture equally off center by approximately 30 thousands of an inch, or a maximum relative distance of 60 thousands, has been found to work well for the purpose intended. The eccentric ring is locked in place by means of a plurality of teeth 39 positioned around its circumference which mesh with a locking element 40, see FIGS. 2 and 3. The eccentric ball 36 is locked in place relative to the retaining ring by means of a plurality of protrusions 41, four shown, extending from the outer surface of the ball coaxial with the eccentric opening therethrough that are received within a like number of mating openings in a ball locking disk 42. The locking element and locking disk are fixed in place by a retainer 44 which is attached by mechanical means 45, such as a screw or the like, to the fuselage 15. When the locking system is in place neither the ring 34 or ball 36 are free to rotate and therefore maintain their relative rotational selected positions.

In practice, the wings 12 pinned to the fuselage by the pivot pin 20 through pivot pin support 46 on the wing and the two upper and lower fuselage ring and ball bearing assembly attachments. After installation of the wing, the retainer 44, ball locking disk 42 and the locking element 40 are removed and the ring 34 and ball 36 are separately rotated until the correct wing incidence and dihedral are achieved and then the ring locking disk, ball locking disk, locking element and retainer are replaced. The X axes and Y axes of FIG. 3 denote inboard/outboard and forward/aft pivot pin movement with rotation of the ring and ball. No further adjustment is required.

Figure 4:
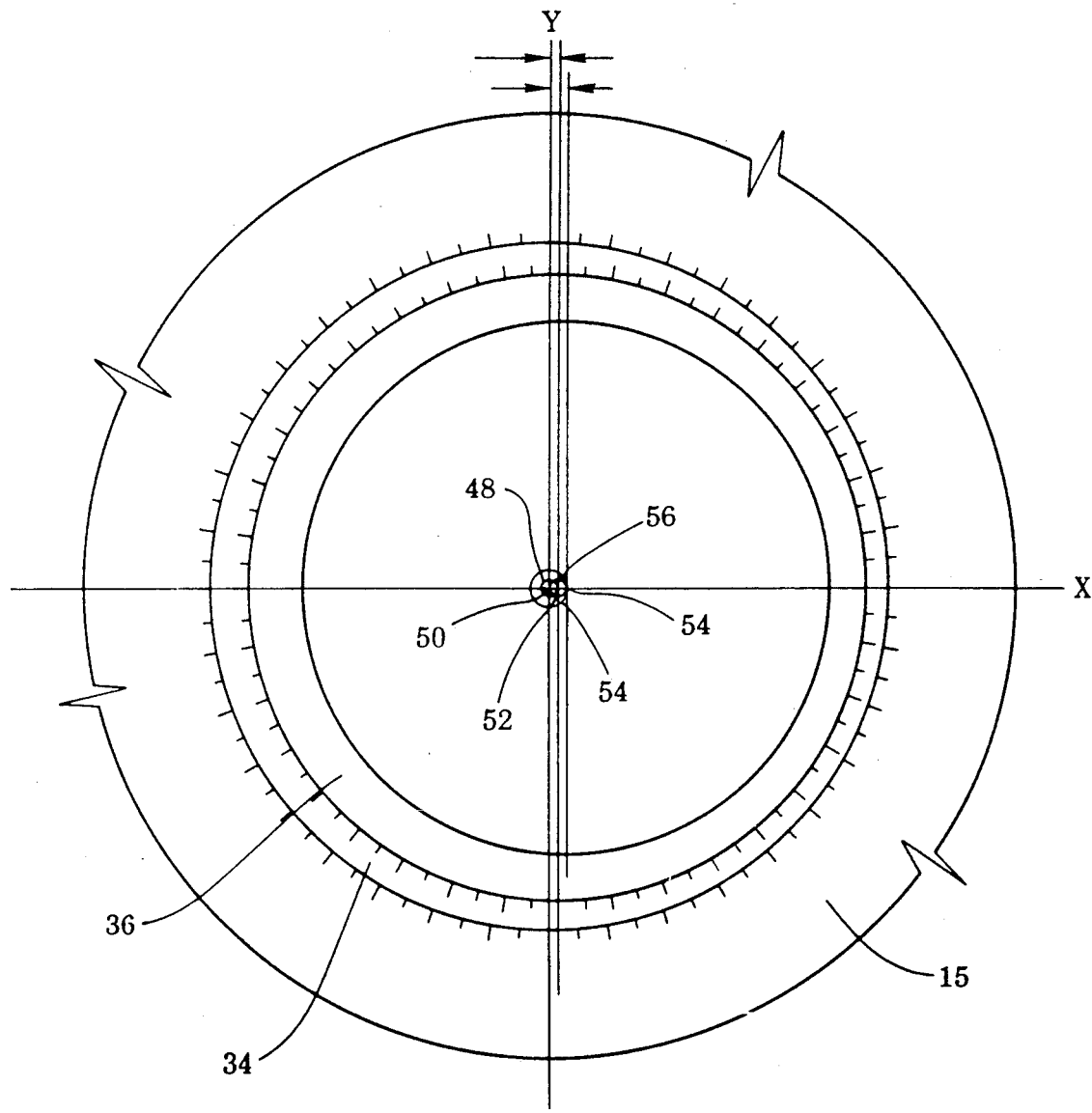
FIG. 4 is a showing tracing the paths of eccentricity of the race and the ball of the eccentric bearing of the invention relative to the fixed position of the race and the angle of incidence of the pin relative to a true center line between the races of the eccentric bearing of the present invention and the opposite non-eccentric bearing.

Referring now specifically to drawing FIG. 4, the eccentric paths of the centerlines of the ring and ball are shown. The Y axes denotes the forward/aft tilting of he pivot pin and the X denotes the inboard/outboard movement of the centerline of the ring and ball. The path of the ring eccentric point is shown as 48, the center 50 where X=0 and Y=0, the ring eccentric point 52, the location zone 54 for the pin 20 center line, the pin and ball eccentric point 54 and the path of the ball eccentric point 56.

While there have been shown and described preferred embodiments of the eccentric bearing system in accordance with the invention, it will be appreciated that many changes and modifications may be made therein without, however, departing from the essential spirit thereof.

What is claimed is:

1. An eccentric ball bearing system comprising:
   a ball retainer ring free to rotate relative to its supporting structure, said ball retainer ring having an aperture therethrough the center of which is spaced from the center of said retainer ring a selected distance;
   a ball retained by said retainer ring and free to rotate relative thereto, said ball having an aperture therethrough the center of which is spaced from the center of said ball a selected distance; and
   a locking means for locking said retainer ring and said ball in selective relative rotational positions whereby the center line of said ball aperture can be translated through a selected distance.

2. The invention as defined in claim 1 wherein the selected offset distance of the center of said ball retainer aperture from the center of said retainer ring is in the range of 20 to 50 thousands of an inch.

3. The invention as defined in claim 1 wherein the selected offset distance of the center of said ball retainer aperture from the center of said retainer ring is approximately 30 thousands of an inch.

4. The invention as defined in claim 1 wherein the selected offset distance of the center of said ball aperture from the center of said ball is in the range of 20 to 50 thousands of an inch.

5. The invention as defined in claim 1 wherein the selected offset distance of the center of said ball aperture from the center of said ball is approximately 30 thousands of an inch.

6. The invention as defined in claim 1 wherein said locking means locks together said retaining ring and said ball to said support structure.

7. An incidence and dihedral adjusting support system for a pivotal wing to fuselage attachment for an aircraft comprising:
   a pivot pin;
   a pair of supporting pivots for receiving said pivot pin for rotatably attaching said wing to said fuselage, one of said pair of supporting pivots having a fixed centerline therethrough for supporting one end of said pivot pin and the other of said supporting pivots having a selectively adjustable centerline therethrough for supporting the other end of said pivot pin whereby the angle of said wing relative to said fuselage can be varied, said other of said supporting pivots comprises
   a ball retainer ring free to rotate relative to its fuselage attachment, said ball retainer ring has an aperture therethrough the center of which is spaced from the center of said ball retainer ring a selected distance,
   a ball retained by said retainer ring and free to rotate relative thereto, said ball having an aperture therethrough the center of which is spaced a selected distance from the center of said ball, and
   a locking means for locking said retainer ring and said ball in selective relative rotational positions whereby the center line of said ball aperture can be translated through a selected distance.

8. The invention as defined in claim 7 wherein the selected offset distance of the center of the ball retainer ring aperture from the center of said retainer ring is in the range of 20 to 50 thousands of an inch.

9. The invention as defined in claim 7 wherein the selected offset distance of the center of the ball retainer ring aperture from the center of said retainer ring is approximately 30 thousands of an inch.

10. The invention as defined in claim 7 wherein the selected offset distance of the center of the ball retainer ring aperture from the center of said ball is in the range of 20 to 50 thousands of an inch.

11. The invention as defined in claim 7 wherein the selected offset distance of the center of the ball retainer ring aperture from the center of said ball is approximately 30 thousands of an inch.

12. The invention as defined in claim 7 wherein said locking means locks together said retaining ring and said ball to said other of said supporting pivots.

* * * * *